United States Patent
Payne et al.

[19]

[11] Patent Number: 5,889,251
[45] Date of Patent: Mar. 30, 1999

[54] APPARATUS FOR NARROW GROOVE WELDING

[75] Inventors: Ronald J. Payne; Robert C. Smith, II, both of Forest, Va.

[73] Assignee: Framatome Technologies, Inc., Lynchburg, Va.

[21] Appl. No.: 837,279

[22] Filed: Apr. 11, 1997

[51] Int. Cl.⁶ .................................................. B23K 9/167
[52] U.S. Cl. ........................ 219/75; 219/125.1; 219/136
[58] Field of Search .................. 219/75, 125.1, 219/125.11, 136, 137.2, 74

[56] References Cited

U.S. PATENT DOCUMENTS

| | | | |
|---|---|---|---|
| 3,659,076 | 4/1972 | Ogden, Sr. | 219/130 |
| 3,940,586 | 2/1976 | Stearns et al. | 219/75 |
| 3,992,603 | 11/1976 | Reynolds | 219/136 |
| 4,110,590 | 8/1978 | Batey et al. | 219/75 |
| 4,298,783 | 11/1981 | Schneider et al. | 219/75 |
| 4,300,034 | 11/1981 | Schneider et al. | 219/75 |
| 4,309,590 | 1/1982 | Stol | 291/137.62 |
| 4,493,971 | 1/1985 | Nawa et al. | 219/137.52 |
| 4,521,670 | 6/1985 | Case, Jr. et al. | 219/130.01 |
| 4,532,406 | 7/1985 | Povlick et al. | 219/124.34 |
| 4,581,518 | 4/1986 | Takahashi et al. | 219/130.01 |
| 4,617,447 | 10/1986 | O'Donohue | 219/124.31 |
| 4,698,484 | 10/1987 | Babcock et al. | 219/130.01 |
| 4,749,839 | 6/1988 | Gordon | 219/75 |
| 4,849,679 | 7/1989 | Taft et al. | 318/577 |
| 5,278,389 | 1/1994 | Braman et al. | 219/125.1 |
| 5,373,139 | 12/1994 | Burgoon et al. | 219/137 |
| 5,393,948 | 2/1995 | Bjorkman, Jr. | 219/74 |
| 5,475,198 | 12/1995 | Burke et al. | 219/124.34 |
| 5,515,589 | 5/1996 | Kazirskis et al. | 29/402.18 |

Primary Examiner—Clifford C. Shaw
Attorney, Agent, or Firm—Rhodes Coats & Bennett, L.L.P.

[57] ABSTRACT

A narrow groove welding apparatus including a torch assembly with a replaceable gas cup so that different length gas cups can be used for different depth grooves. An adjustable support assembly is provided to permit corresponding positioning of auxiliary components, including visual monitoring assemblies, wire feed assemblies, and illumination assemblies to ensure proper alignment of the auxiliary components with the weld zone. A torch assembly permits ready replacement of electrodes to match gas cups, and electrically isolates the electrode from the gas cup.

18 Claims, 5 Drawing Sheets

FIG. 5

APPARATUS FOR NARROW GROOVE WELDING

BACKGROUND OF THE INVENTION

(1) Field of the Invention

The present invention relates generally to narrow groove welding and, more particularly, to a narrow groove welding apparatus with replaceable gas cups so that the apparatus can be used to weld grooves of different depths.

(2) Description of the Prior Art

Narrow groove welding can be defined as the welding of opposed faces of two metal parts that are separated by narrow space in the form of a groove, which may have a depth of 5 inches or more. The angle of the groove is kept small to minimize the amount of welding required, and thus the time involved.

In narrow groove welding a nonconsumable electrode mounted in a carrier is inserted into the groove between parts to be welded, with the end of the electrode being spaced from the area being welded, i.e., the weld zone, at a predetermined distance. An electrical current forms an arc between the electrode tip and the work piece, and a consumable wire is fed into the weld zone to provide material to fill the groove. To avoid oxidation of the metal parts during welding, the electrode is surrounded by a spaced annular housing, or gas cap, and an inert covering gas, e.g., argon or a mixture of argon and helium, is fed between the housing and electrode and out of an opening in the bottom of the gas cup to create a gas blanket over the weld zone.

The electrode carrier, the gas cup, and related components, including a torch block for mounting the electrode carrier and the gas cup, are together referred to as the torch assembly. In automatic or semi-automatic welding, the torch assembly is carried along a set pathway by a motorized weldhead or transport mechanism, with the torch being vertically positionable on the weldhead. As the groove is filled, the torch assembly is raised to properly position the electrode tip in relation to the weld zone. In addition, torch assemblies are known in the prior art in which the gas cup can be replaced with a gas cup of a different length, so that progressively shorter gas cups can be used as the groove is filled.

Replacement of the gas cup requires a corresponding replacement of the electrode of a different length, or an adjustment in the vertical length of the existing electrode so that the tip of the electrode projects the desired distance from the gas cup. Electrode replacement is also required due to electrode erosion or wear. Depending on amperage, this may need to be done as often as once per arc-hour.

Narrow groove welding apparatuses are also known to include a visual monitoring mechanism, such as a fiberscope or lens in the vicinity of, and directed toward, the weld zone so that the operator can monitor the condition of the weld. The monitoring mechanism may also include a light source to illuminate the weld when welding is not taking place. Weld monitoring mechanisms per se are known in the prior art as exemplified by U.S. Pat. Nos. 4,581,518 to Takahashi et al, and 5,475,198 to Burke et al.

Replacement of gas cups in prior art welding apparatus has been difficult and time consuming. In addition, adjustment of the electrode position to the proper length has been cumbersome, and has exposed the operator to the welding environment for a lengthy period of time. Finally, there has been no convenient means for repositioning auxiliary components so that they are directed toward the weld zone after replacement of the gas cup with a gas cup of a different length.

Thus, there remains a need for a new and improved narrow groove welding apparatus which provides for ready replacement of welding torch gas cups and electrodes of a length corresponding to the gas cup length while, at the same time, also provides for quick positioning of auxiliary components to accurately direct the components toward the welding zone.

The present invention is also directed to a new and improved torch assembly including a replacement electrode carrier in which the electrode is pre-positioned to a predetermined height matching the replacement gas cup, thus allowing the operator to quickly replace the previous electrode with an electrode of the proper length when changing gas cups. The torch assembly also includes insulators for electrically isolating the electrode from the gas cap, thus preventing arcing between the gas cup and the workpiece.

SUMMARY OF THE INVENTION

The present invention is directed to a narrow groove welding apparatus which is mountable on a weldhead or transport mechanism. The apparatus includes a torch assembly and an adjustable support assembly adapted to adjustably support one or more auxiliary components relative to a weld zone. As used herein "auxiliary components" include visual monitoring mechanisms, illumination mechanisms, wire feed mechanisms, and other narrow groove welder components that are directed toward the welding zone during use of the welding apparatus. In addition, the apparatus includes, a gas conduit for directing a cover gas over the weld zone, and water conduits for directing cooling water to the torch and auxiliary components.

The torch assembly of the present invention is designed to permit replacement of gas cups of different length, and to permit replacement of electrodes of different length as required by the gas cup replacement. In general, the torch assembly is comprised of a torch block with a lower surface, and a electrode carrier receiving bore extending vertically through the block; a replaceable gas cup attachable to the lower block surface; and an electrode carrier to secure a nonconsumable electrode of predetermined length positioned in the bore.

When assembled, the electrode carrier is mounted in the torch block bore, the gas cup is fitted to the lower surface of the torch block, and an electrode carried by the electrode carrier extends downwardly through the gas cup, with the tip of the electrode extending beyond the lower edge of the gas cup.

In order to prevent electrical arcing between the gas cup and the workpiece, the torch assembly also includes an insulation tube around electrode within gas cup, and an insulation plate positioned between the lower surface of the torch block and gas cap.

The gas cap can also include one or more diffuser screens to impart laminar flow to the cover gas. An electrode conduit extends downwardly from the torch block centrally through the gas cup and diffuser screens, and gas conduits are provided to permit the flow of gas from the block, around the lower end of the electrode, and out of the lower end of the gas cup to cover the weld zone.

Auxiliary components, to be described in greater detail hereinafter, are aligned in the direction of the weld zone during operation of the welding apparatus with a gas cup of a given length. For example, the auxiliary components may be directed downwardly at an angle of from about 30°–45° below horizontal. However, when the gas cup being used is replaced by a gas cup of a different length, the electrode length will be changed and the welding apparatus will be positioned at a different height relative to the weld zone to correctly position the electrode tip relative to the workpiece. For example, when a longer gas cup is replaced with a shorter gas cup to adjust for a shallower groove, a shorter, or shortened, electrode will be used, and the welding apparatus will be moved closer to the weld zone.

As a result, auxiliary components that were previously aligned with the weld zone, will now be out of alignment. In prior art devices, readjustment of the auxiliary components has been time consuming and difficult in view of the operating environment. The present invention addresses this misalignment by positioning auxiliary components on an adjustable support mechanism, so that the position of the auxiliary components can be readily changed to adjust for changes in gas cups.

The adjustment support assembly of the present invention includes at least one outwardly extendable arm mounted at the torch assembly, e.g., on the torch block, with auxiliary attachment means being mounted at the distal end of the arm. Preferably, the adjustment assembly is comprised of two arms, that project outwardly in opposed directions, permitting the attachment of auxiliary components on both the leading and trailing sides of the welding zone.

The arms may be attached to the torch assembly, e.g., to the torch block, with a releasable clamp to secure the arm in a desired position, with the arm being slidable within the clamp when loosened, thereby permitting the arm to be extended or retracted. The auxiliary component attachment mounts, which may be a part of the auxiliary component, is used to secure the component to the outer end on the arm. More than one auxiliary component may be attached to an arm.

In automatic or semi-automatic, narrow groove welding, it is necessary to monitor the condition of the weld zone to ensure that the welding is being conducted properly. This monitoring may be done by directing the lens or image receiving component of a camera toward the welding zone, and recording the image on a camera or television screen. An illumination source is normally used in combination with the camera, to permit monitoring of the zone when welding is not being done. During welding, the arc provides the illumination required.

Thus, one of the more important auxiliary components used as a part of the present apparatus is one or more cameras, or the image collection element thereof, mounted to view the welding zone. In the present description, the term "camera" should be understood to encompass a visual monitoring assembly in which a part of the assembly, e.g. the image detection component, is mounted on the support assembly and is in communication with other visual monitoring assembly components located at a remote position. One or two cameras may be used, with one of the cameras being preferably directed toward the leading side of the weld zone. When two cameras are used, one will preferably be directed toward the leading side of the zone, and the other toward the trailing side of the zone, permitting a full view of conditions. A light source will normally be mounted with the camera.

Narrow groove welding apparatus of the type described herein also requires a mechanism to feed consumable wire to the welding zone, where the wire is melted to fill the groove. Various automatic wire feeding devices are known in the prior art, and the exact structure of this device does not per se form a feature of the invention. In the present invention the wire feed mechanism is mounted onto one of the arms of the support assembly, preferably the leading arm, with the wire nozzle being angled toward the weld zone.

In operation, a gas cup and an electrode carrier with an electrode of the appropriate length is mounted in the torch assembly, and the torch assembly is positioned in the groove over the weld zone. Electrical current is fed to the electrode; a cover gas is fed to the weld zone from a supply source through a conduit that extends to the torch assembly, and downwardly through the gas cup; and water is circulated through the water cooling conduits of the torch assembly and any auxiliary components, e.g., cameras.

Filler wire is fed into the weld zone from a wire feed assembly mounted on the support assembly and directed toward the weld zone. The leading and/or trailing sides of the weld zone may be monitored by cameras mounted on the support assembly and directed toward the weld zone.

After the groove is filled to a given level, the gas cup is replaced with a shorter gas cup. At the same time, the electrode carrier is removed from the torch assembly, and is quickly replaced with another electrode carrier holding a shorter electrode that has been set to a predetermined length corresponding to the length of the new, shorter gas cup. The support assembly clamp is loosened, and the arms are slid inwardly to a predetermined position to align the downwardly angled cameras and wire feed assembly with the weld zone.

Welding is then restarted, and continues until it is again necessary to replace the gas cup and electrode with shorter components, and readjust the support assembly arms to align the auxiliary components.

Accordingly, one aspect of the present invention is to provide an apparatus for narrow groove welding, the apparatus including: (a) a torch assembly including a replaceable gas cup, the torch assembly being positionable over a weld zone; and (b) a replaceable electrode carrier in which the electrode is pre-positioned to a predetermined height matching the replaceable gas cup.

Another aspect of the present invention is to provide a torch assembly for a narrow groove welding apparatus, the torch including: (a) a torch block having a vertical electrode carrier bore and a lower surface adapted for attachment of a gas cup; (b) a replaceable gas cup attached to the lower surface of the torch block; and (c) a replaceable electrode cartridge assembly mounted within the carrier bore in which the electrode is pre-positioned to a predetermined height matching the replaceable gas cup, the carrier including an electrode clamp to clamp an electrode in a vertical, downwardly extending position, with the distal end of the electrode extending a predetermined distance beyond the lower end of the gas cup.

Still another aspect of the present invention is to provide an apparatus for narrow groove welding, the apparatus including: (a) a torch block having a vertical electrode carrier bore and a lower surface adapted for attachment of a gas cup, the torch assembly being positionable over a weld zone; (b) a replaceable gas cup attached to the lower surface of the torch block; (c) a replaceable electrode cartridge assembly mounted within the carrier bore in which the electrode is pre-positioned to a predetermined height matching the replaceable gas cup, the carrier including an electrode clamp to clamp an electrode in a vertical, downwardly extending position, with the distal end of the electrode extending a predetermined distance beyond the lower end of the gas cup; and (d) an adjustable support assembly connected to the torch assembly and extending outwardly therefrom for supporting at least one auxiliary component mounted on the support assembly, the auxiliary component being directed toward the weld zone.

These and other aspects of the present invention will become apparent to those skilled in the art after a reading of the following description of the preferred embodiment when considered with the drawings.

DESCRIPTION OF THE PREFERRED EMBODIMENTS

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Figure 1:
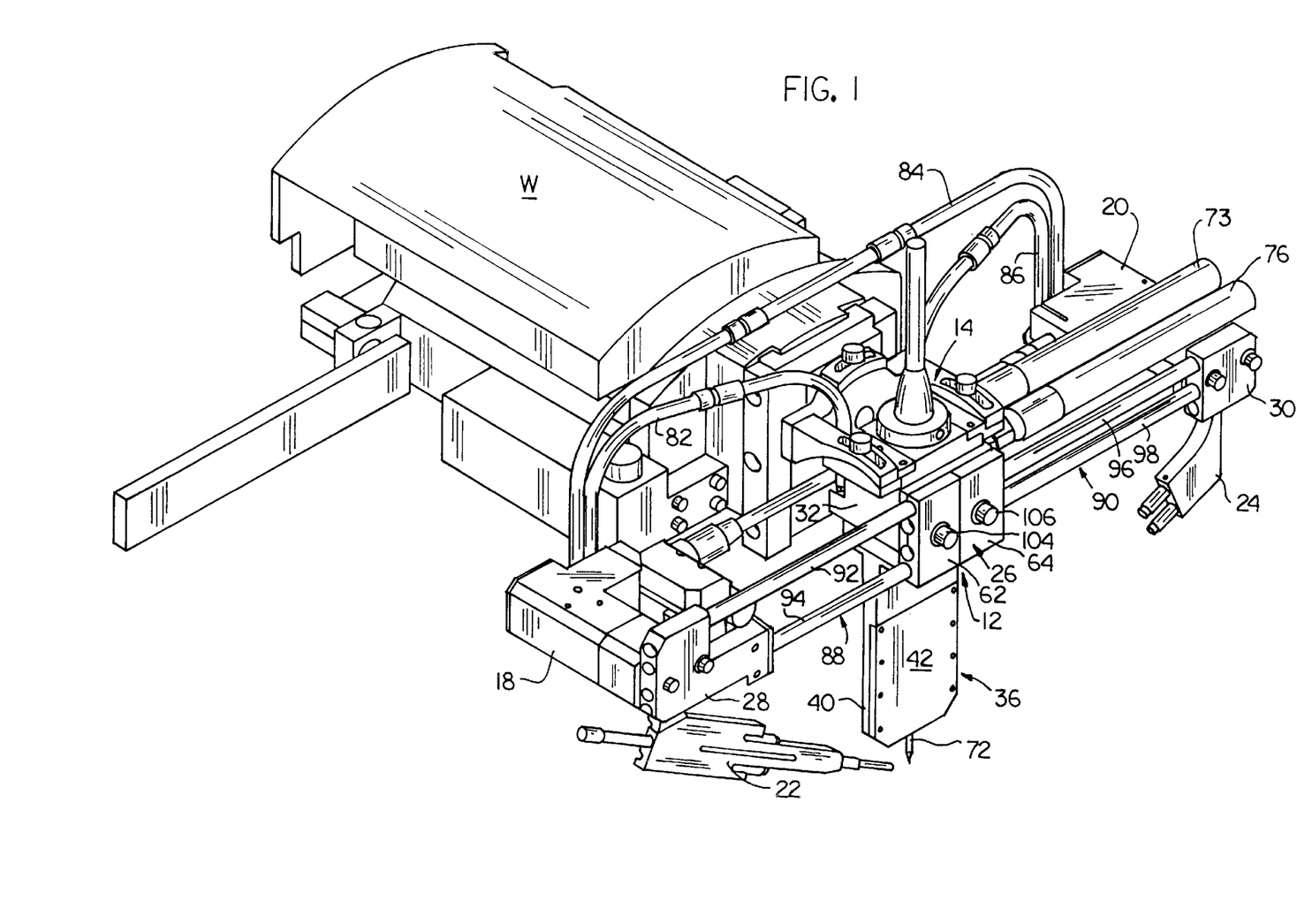
FIG. 1 is a perspective view of a welding apparatus with an extended gas cup constructed according to the present invention.

Referring now to the drawings in general and FIG. 1 in particular, it will be understood that the illustrations are for the purpose of describing a preferred embodiment of the invention and are not intended to limit the invention thereto. As best seen in FIG. 1, a welding apparatus, generally designated 10, constructed according to the present invention is shown mounted on a weldhead W. The apparatus includes a torch assembly 12, including an electrode carrier 14; an adjustable support assembly 16; lead and trail cameras, 18 and 20, respectively; a wire feed assembly 22, which also incorporates an illumination means; and trail lamps 24.

Support assembly 16 is mounted onto torch assembly 12 by adjustable clamp 26; camera 18 and wire feed mechanism 22 are mounted onto the outer end of support assembly 16 with attachment means 28, and camera 20 and trail lamps 24 and mounted onto the opposed outer end of support assembly 16 with attachment means 30.

Figure 2:
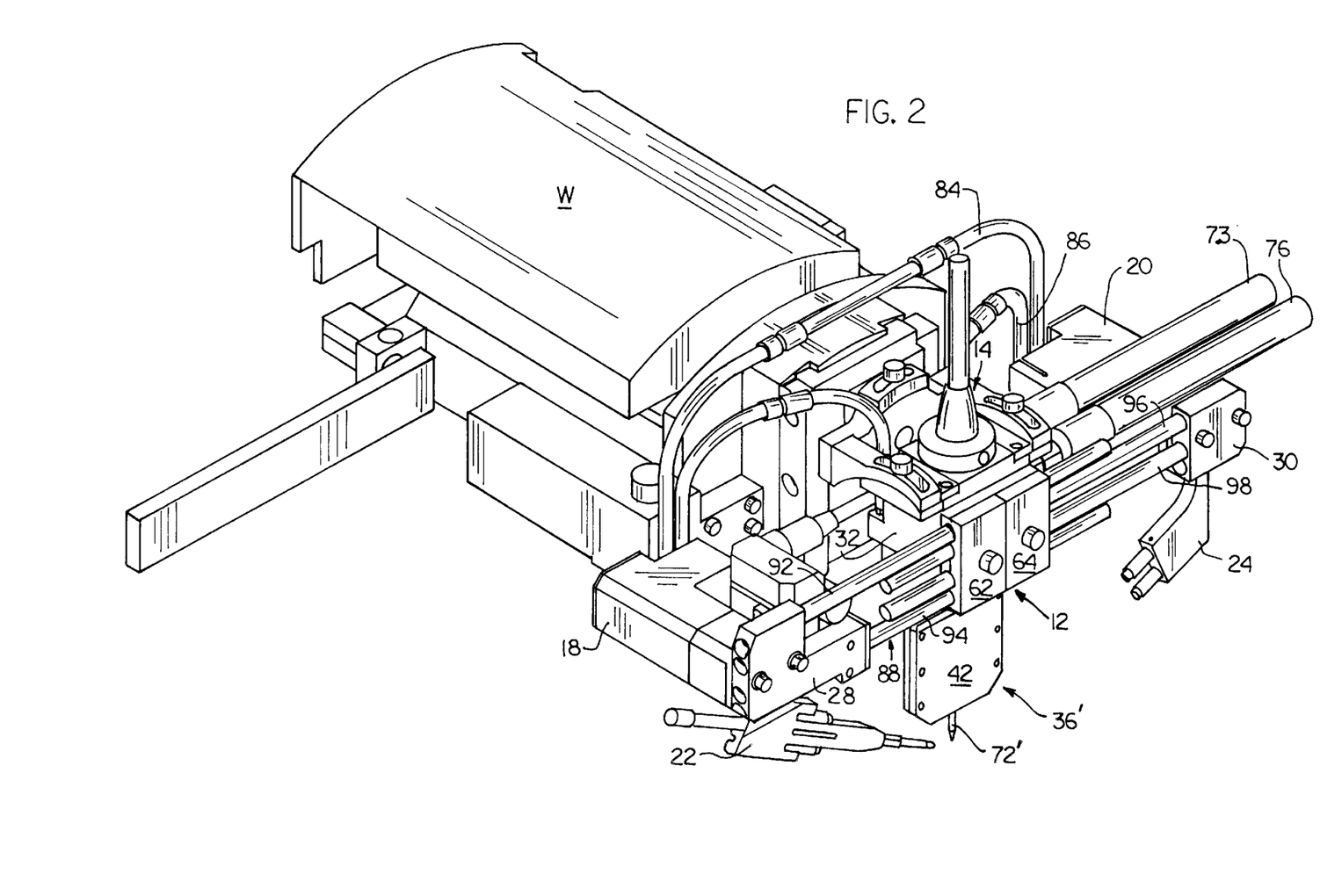
FIG. 2 is a perspective view of the welding apparatus with an intermediate gas cup.
Figure 3:
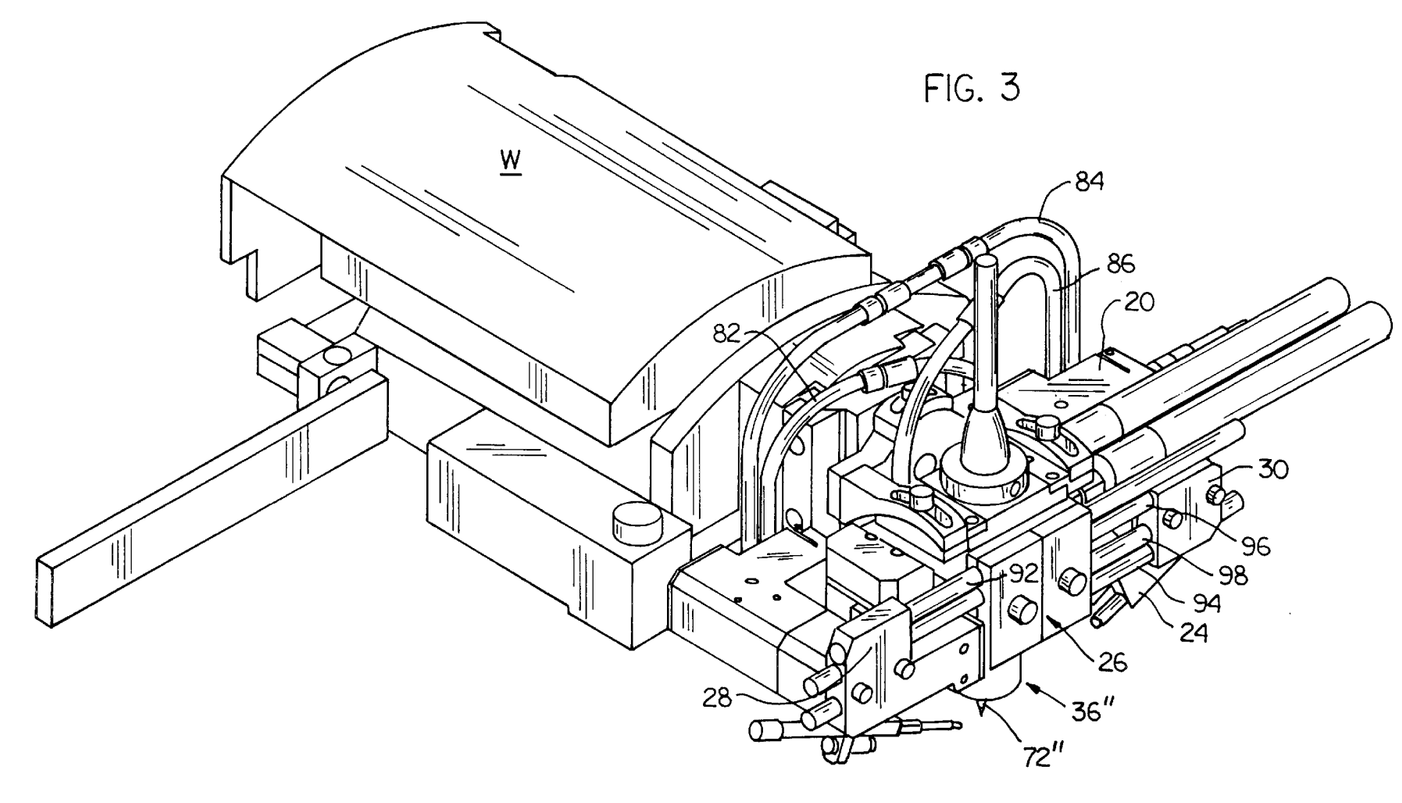
FIG. 3 is a perspective view of the welding apparatus with a short gas cup as known in the prior art.
Figure 4:
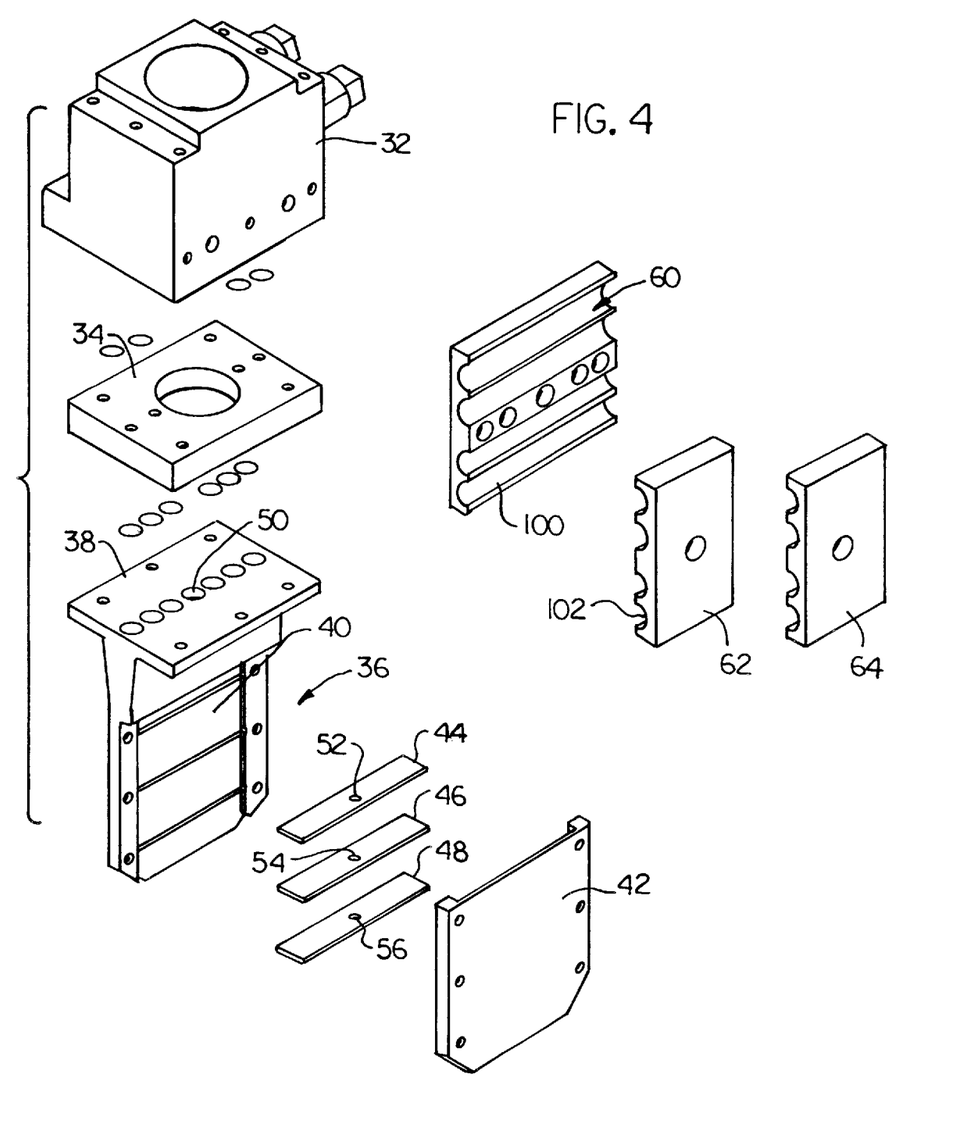
FIG. 4 is a perspective exploded view of the torch block with an extended gas cup, the torch block with an intermediate gas cup being substantially identical except for dimensions.

FIG. 2 illustrates the invention with the longer gas cup 36, illustrated in detail in FIG. 4, being replaced by an intermediate length gas cup 36' substantially identical except for dimensions. FIG. 3 illustrates the invention a shorter gas cup 36" of the design known in the prior art.

Figure 5:
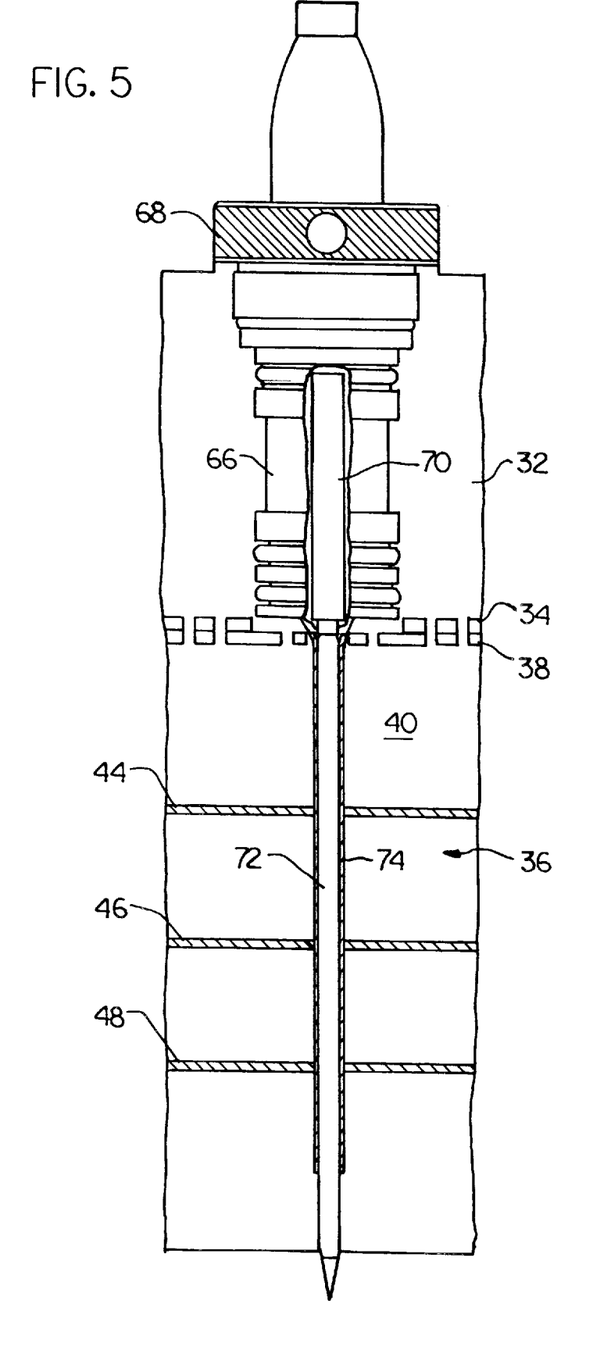
FIG. 5 is a cut away side view of the torch assembly using the extended gas cup.

As best shown in FIGS. 4 and 5, torch assembly 12 in the longer configuration, is comprised of an electrode carrier 14, a torch block 32, an insulator plate 34, and a gas cup 36. Cup 36 is comprised of top plate 38, rear plate 40 and removable front plate 42. Parallel diffuser screens 44, 46 and 48, are spaced within cup 36. Electrode conduits 50, 52, 54 and 56 extend through top plate 38 and screens 44, 46, and 48, respectively. A support assembly attachment clamp, generally 58, is comprised of a back plate 60, and front plates 62 and 64. Electrode carrier 14 is comprised of a housing 66, an attachment knob 68, and electrode clamp 70 to secure an electrode 72 at a predetermined length. In addition, an insulating sleeve 74, formed of a ceramic material, is positioned around electrode 72 to insulate electrode 72 from gas cup 36.

Referring back to FIGS. 1, it will be seen that the welding apparatus also includes entry and exit conduits, 73 and 76, respectively, for carrying cover gas to and from, and gas to, the welding apparatus. Conduit 73 is connected to gas and water supply sources (not shown) and conduit 76 is connected to a receptacle (not shown) for exhausted water. Cover gas is conveyed from conduit 73 into torch block 32, and then downwardly through insulator plate 34, and into gas cup 36, through gas orifices 78 and 80. The gas then flows through diffuser screens 44, 46 and 48 to create laminar flow, and then out of the lower end of gas cup 36 to form a blanket of gas around the weld zone.

Water entering the welding apparatus through conduit 73 is first circulated through torch assembly 12, then to lead camera 18 through conduit 82, then to trail camera 20 through conduit 84, is returned to torch assembly 12 through conduit 86, and is finally exhausted through exhaust conduit 76.

Adjustable support assembly 16 is comprised of support assembly attachment clamp 58, and opposed, horizontal, left and right arms 88 and 90. Left arm 88 is formed of parallel rods 92 and 94, while right arm 90 is formed of parallel rods 96 and 98. The inner ends of rods 92, 94, 96 and 98 are in clamp 58 between back plate 60, and front plates 62 and 64. Plate 60 includes parallel, horizontal, semi-circular grooves 100, and plates 62 and 64 include cooperating, semi-circular grooves 102, together forming conduits for the rods. Plates 62 and 64 are releasably secured to back plate 60 with set screws 104 and 106.

Camera 18 and wire feed assembly 22 is mounted onto the distal end of rods 92 and 94 with attachment mount 28. Camera 20 and trail lamps 24 are mounted onto the distal ends of rods 96 and 98 with attachment mount 28.

In operation, gas cup 36 and an electrode carrier 14 with a longer electrode corresponding to the length of gas cup 36, is mounted in torch assembly 12, which is positioned on the weldhead with gas cup 36 projecting into the groove and over the weld zone. Electrical current is fed to electrode 72; argon gas is fed to the weld zone from a supply source through conduit 74 to torch block 32, and downwardly through gas cup 36 to the weld zone; and water is circulated through water cooling conduits 82, 84 and 86. to cool torch assembly 12, cameras 18 and 20, trail lamps 24, and wire feed assembly 22. Filler wire is fed into the weld zone from wire feed assembly 22, and the leading and/or trailing sides of the weld zone are monitored by cameras 18 and 20.

After the groove is filled to a given level, welding is momentarily halted, and the longer gas cup 36 is replaced with intermediate gas cup 36'. At the same time, electrode carrier 14 is removed from torch assembly 12, and another electrode carrier 14 holding an intermediate length electrode 72' that has been mounted in carrier 14 at a predetermined length corresponding to the length of intermediate gas cup 36' is substituted. Clamp 26 holding rods 92, 94, 96 and 98 is loosened, and the rods are slid inwardly to a predetermined extension, which may be marked on the rods, to align the directions of downwardly angled cameras 18 and 20 and wire feed assembly 22 with the new location of the weld zone.

Welding is then restarted, and continues until it is necessary to replace gas cup 36' and electrode 72' with gas cup 36" and electrode 72", and readjust the length of the support assembly arms to align the auxiliary component with the weld zone.

In the description of the preferred embodiment, an apparatus with three sizes of gas cups was described to illustrate the invention. It is to be understood, however, that a greater number of gas cups and corresponding electrode lengths may be required, depending upon the groove depth and operating conditions, and that more than three gas cups and corresponding electrodes are within the scope of the present invention.

For example, the XXL unit shown in FIG. 1 may be used up to about 5 inches (narrow groove only). The XL unit shown in FIGS. 2 and 4 may be used up to about 3½ inches (narrow groove and cylindrical), changing at about ⅝ inches to keep good coverage. The STD unit (not shown) may be used up to about 1½ inches and is about ½ inches longer than a regular cup (narrow groove and cylindrical). A LONG unit (not shown) would be used, if needed, between the XL and STD units. A SHORT unit shown in FIG. 3 may be used for surface welding or a very shallow narrow groove.

Certain modifications and improvements will occur to those skilled in the art upon a reading of the foregoing description. It should be understood that all such modifications and improvements have been deleted herein for the sake of conciseness and readability but are properly within the scope of the following claims.

We claim:

1. An apparatus for narrow groove welding, said apparatus comprising:
    (a) a torch assembly including a replaceable gas cup, said torch assembly being positionable over a weld zone;
    (b) a replaceable electrode carrier in which the electrode is pre-positioned to a predetermined height matching said replaceable gas cup; and
    (c) an adjustable support assembly connected to said torch assembly and extending outwardly therefrom for supporting at least one auxiliary component mounted on said support assembly and being directed toward said weld zone, wherein said adjustable support assembly includes:
        (i) a releasable clamp joined to said torch assembly, said releasable clamp having a back plate attached to said torch assembly, at least one front plate, and releasable attachment means for clamping said plates together, said plates including facing receiving grooves for slidably holding said arm,
        (ii) at least one outwardly projecting arm having an inner end held in said clamp and an outer end, and
        (iii) an auxiliary component mount on said outer end adapted to carry an auxiliary component.

2. The apparatus according to claim 1, wherein said support assembly includes a releasable clamp joined to said torch assembly, first and second opposed horizontal arms having inner ends and outer ends, the inner ends of said arms being slidably held by said releasable clamp, and auxiliary component mounts on said outer ends.

3. The apparatus according to claim 1, wherein said auxiliary component is selected from the group consisting of a camera, a wire feed assembly and a light.

4. The apparatus according to claim 1, further including a gas conduit connected to said torch assembly for feeding cover gas to said weld zone.

5. The apparatus according to claim 1, further including a water conduit connected to said torch assembly for cooling said torch assembly.

6. A torch assembly for a narrow groove welding apparatus, said torch comprising:
    (a) a torch block having a vertical electrode carrier bore and a lower surface adapted for attachment of a gas cup;
    (b) a replaceable gas cup attached to the lower surface of said torch block;
    (c) a replaceable electrode cartridge assembly mounted within said carrier bore in which the electrode is pre-positioned to a predetermined height matching said replaceable gas cup, said carrier including an electrode clamp to clamp an electrode in a vertical, downwardly extending position, with the distal end of said electrode extending a predetermined distance beyond the lower end of said gas cup; and
    (d) an insulator to insulate an electrode carried by said carrier from said gas cup, wherein said insulator is comprised of an insulator tube positionable around said electrode within said gas cup, and an insulator plate between torch block and said gas cup.

7. The apparatus according to claim 6, wherein said gas cup includes a plurality of horizontal spaced diffuser screens.

8. The apparatus according to claim 6, further including a gas conduit within said gas cup around said electrode.

9. An apparatus for narrow groove welding, said apparatus comprising:
    (a) a torch block having a vertical electrode carrier bore and a lower surface adapted for attachment of a gas cup, said torch assembly being positionable over a weld zone;
    (b) a replaceable gas cup attached to the lower surface of said torch block;
    (c) a replaceable electrode cartridge assembly mounted within said carrier bore in which the electrode is pre-positioned to a predetermined height matching said replaceable gas cup, said carrier including an electrode clamp to clamp an electrode in a vertical, downwardly extending position, with the distal end of said electrode extending a predetermined distance beyond the lower end of said gas cup;
    (d) an adjustable support assembly connected to said torch assembly and extending outwardly therefrom for supporting at least one auxiliary component mounted on said support assembly, said auxiliary component being directed toward said weld zone; and
    (e) an insulator to insulate an electrode carried by said carrier from said gas cup, wherein said insulator is comprised of an insulator tube positionable around said electrode within said gas cup, and an insulator plate between said torch block and said gas cup.

10. The apparatus according to claim 9, wherein said support assembly includes a releasable clamp joined to said torch assembly, at least one outwardly projecting arm having an inner end held in said clamp and an outer end, and an auxiliary component mount on said outer end adapted to carry an auxiliary component.

11. The apparatus according to claim 10, wherein said releasable clamp includes a back plate attached to said torch assembly, at least one front plate, and releasable attachment means for clamping said plates together, said plates including facing receiving grooves for slidably holding said arm.

12. The apparatus according to claim 9, wherein said support assembly includes a releasable clamp joined to said torch assembly, first and second opposed horizontal arms having inner ends and outer ends, the inner ends of said arms being slidably held by said releasable clamp, and auxiliary component mounts on said outer ends.

13. The apparatus according to claim 9, wherein said auxiliary component is selected from the group consisting of a camera, a wire feed assembly and a light.

14. The apparatus according to claim 9, further including a gas conduit connected to said torch assembly for feeding cover gas to said weld zone.

15. The apparatus according to claim 9, further including a water conduit connected to said torch assembly for cooling said torch assembly.

16. The apparatus according to claim 9, wherein said gas cup includes a plurality of horizontal spaced diffuser screens.

17. The apparatus according to claim 9, further including a gas conduit within said gas cup around said electrode.

18. An apparatus for narrow groove welding, said apparatus comprising:

(a) a torch assembly including a replaceable gas cup, said torch assembly being positionable over a weld zone;

(b) a replaceable electrode carrier in which the electrode is pre-positioned to a predetermined height matching said replaceable gas cup; and (c) an adjustable support assembly connected to said torch assembly and extending outwardly therefrom for supporting at least one auxiliary component mounted on said support assembly, said auxiliary component being directed toward said weld zone, said support assembly including a releasable clamp joined to said torch assembly, first and second opposed horizontal arms having inner ends and outer ends, the inner ends of said arms being slidably held by said releasable clamp, and auxiliary component mounts on said outer ends.

* * * * *